United States Patent [19]

Bleckmann et al.

[11] Patent Number: 4,930,845
[45] Date of Patent: Jun. 5, 1990

[54] PROCESS AND CIRCUIT CONFIGURATION FOR CONTROLLING A BRAKE SYSTEM WITH SEQUENTIAL BRAKE PRESSURE MODULATION

[75] Inventors: Hans W. Bleckmann, Obermoerlen; Helmut Fennel, Bad Soden; Johannes Graeber, Eschborn; Otto Determann, Darmstadt; Ivica Batistic, Frankfurt/Main, all of Fed. Rep. of Germany

[73] Assignee: Alfred Teves GmbH, Frankfurt, Fed. Rep. of Germany

[21] Appl. No.: 323,921

[22] Filed: Mar. 15, 1989

[30] Foreign Application Priority Data

Mar. 18, 1988 [DE] Fed. Rep. of Germany ....... 3809099

[51] Int. Cl.$^5$ .......................... B60T 8/58; B60T 8/60
[52] U.S. Cl. .................................... 303/100; 303/104; 60/547.1
[58] Field of Search ................. 303/93, 100, 102, 103, 303/104, 110, 114, 115, DIG. 3, DIG. 4; 188/181 A, 181 C; 60/545, 547.1

[56] References Cited

U.S. PATENT DOCUMENTS

| 4,512,615 | 4/1985 | Kita et al. | 303/114 X |
| 4,644,453 | 5/1987 | Kade et al. | 303/104 X |
| 4,662,687 | 5/1987 | Leiber | 303/114 X |
| 4,726,549 | 2/1988 | Dittner et al. | 303/61 X |
| 4,824,182 | 4/1989 | Steffes et al. | 303/114 X |
| 4,836,618 | 6/1989 | Wakata et al. | 303/103 |

FOREIGN PATENT DOCUMENTS 0166552 8/1985 Japan .................................. 303/100

Primary Examiner—Andres Kashnikow
Assistant Examiner—Timothy Newholm
Attorney, Agent, or Firm—Robert P. Seitter

[57] ABSTRACT

A control system and method for a brake system with anti-locking and/or traction slip control and sequential brake pressure modulation. A modulator pressure pattern is formed in a circuit (33) by measuring and evaluating variables determining the pressure in the control chamber of chambers (21) of a brake pressure modulator (4). The modulator pressure pattern represents, by approximation, the course of pressure in the modulator (4). This modulator pressure pattern is considered in the brake pressure control, that is in determining the excitation periods of the multi-way valves (13-16, 22, 23, 25) determining the pressure in a modulator chamber (21) of the brake pressure modulator (4) and in the wheel brakes (9-12). The pressure pattern is formed by integration of the valve excitation periods of the pressure increase and pressure decrease characteristics of the modulator (4) under consideration or of the entire system.

6 Claims, 3 Drawing Sheets

PROCESS AND CIRCUIT CONFIGURATION FOR CONTROLLING A BRAKE SYSTEM WITH SEQUENTIAL BRAKE PRESSURE MODULATION

BACKGROUND OF THE INVENTION

The present invention relates to a process for controlling a brake system with anti-locking and/or traction slip control. In the event of control, brake pressure is sequentially modulated in the individual control channels. For this purpose, a master cylinder is connected to the wheel brakes individually and/or in groups through multi-way valves open in the basic position and re-switchable to the blocking position and a modulator is coupled to the master cylinder. The modulator, through auxiliary pressure equally controlled by multi-way valves, provides a force component counter-acting the pedal force. Through wheel sensors, the rotating pattern of the wheels is determined and electrical signals for controlling the multi-way valves are generated. A circuit configuration for carrying out the process is also provided by the present invention.

Processes and brake systems of this type have been described, wherein, for anti-locking control purposes, the brake pressure in the wheel brakes of the individual wheels or in wheel groups is sequentially modulated in a so-called time multiplex operation. U.S. Pat. Nos. 4,659,153 and 4,702,531 describe hydraulic brake systems comprising a single or tandem master cylinder coupled to a vacuum pressure booster or a hydraulic booster for pedal force boosting. Provided in each pressure fluid conduit leading from the master cylinder to the controlled wheels is a 2-way/2-position valve which is open in the resting position. Through temporary exchange of the vacuum pressure connection with the atmospheric connection of the vacuum servo aggregate or, in the event of a hydraulic booster, through bypassing the auxiliary pressure to the opposite front face of the booster piston, an auxiliary force counter-acting the pedal force is generated for anti-locking control purposes. The pressure within the working chambers of the master cylinder is decreased through the auxiliary force, thereby causing pressure fluid to flow back through the 2-way/2-position valve switched to the passage position from the associated wheel brake, whereas in the remaining wheel brakes, the brake pressure is kept constant through reswitching the respective 2-way/2-position valves to the blocking position. Thereafter, the pressure fluid conduit to another wheel brake is released while the other wheel valves are blocked, thereby adjusting successively, (i.e., sequentially) the brake pressure in all wheel brakes to the desired value. The principle of sequential modulation does not preclude brake pressure in several wheel brakes being modulated in parallel once a cophasal pressure change is caused in the wheel brakes. In rapid changes in pressure and auxiliary force, identical results can be attained, at least theoretically, by sequential modulation and by a control in parallel of the brake pressure in all control channels.

The speed at which brake pressure can be decreased and re-increased during an anti-locking control, is of utmost importance for control quality and driving stability, respectively, for attaining short stopping distances and for comfort during the control. It is, therefore, a disadvantage that between successive control operations (i.e., between blocking of the pressure fluid conduit leading to the brake in which the pressure has just been changed and connection of the next wheel brake to the master cylinder) waiting times must always be tolerated. For example, once the pressure in a control channel is to be decreased, the pressure in the master cylinder will first have to be decreased to a value below the pressure prevailing in the wheel brake. If a pressure increase is required after completion of a pressure change operation, essentially the same problem arises. The required waiting times are relatively extended because the actual pressure level in the working chambers of the master cylinder, in the modulator coupled ahead thereof, and in the wheel brakes, is not known as pressure sensors are not provided for cost saving reasons. Consequently, the pressure in the master cylinder and in the modulator coupled ahead thereof, prior to opening the conduit leading to the wheel brake will always have to be decreased and increased, respectively, to an extent such that the pressure in the master cylinder "reliably" is below and above. respectively, the pressure in the wheel brake.

SUMMARY OF THE INVENTION

It is, therefore, an object of the invention to obtain with little additional measures and, in particular, without the provision of additional sensors, information on the instantaneous pressure and the course of pressure, respectively, in the modulator coupled ahead of the master cylinder in order to keep the delay time between switching from one control channel to the other as low as possible.

This object is achieved by measuring and evaluating variables determining the pressure in the control chamber or chambers of the modulator whereby a modulator pressure pattern approximately representing the course of pressure in the modulator is formulated and considered in the brake pressure control (i.e., in the determination of the periods of excitation of the multi-way valves).

It has found to be particularly advantageous, in providing the modulator pressure pattern, to measure and integrate the periods of excitation of the multi-way valves actuating the modulator under incorporation of the pressure build-up and pressure decrease characteristics of the system. In the practice of the invention, in forming the modulator pressure pattern, a value approximately in proportion to the pedal force derived from the vehicle delay and/or the time between applying of the brake and commencing of the control, from the control frequency etc., is additionally considered.

In another advantageous embodiment of the present invention, the excitation periods of the multi-way valves in the pressure fluid conduits leading to the wheel brakes, are equally considered in forming the modulator pressure pattern. In this respect by measuring and integrating variables determining the pressure in the wheel brakes, a wheel pressure pattern can be formed and additionally considered in determining the excitation times of the multi-way valves. In forming the wheel pressure pattern, the excitation periods of the multi-way valves disposed in the pressure fluid conduits leading to the wheel brakes, under incorporation of the pressure increase and pressure decrease characteristics of the system and of a variable proportional to the pressure in the wheel brake upon commencement of the control, are measured and integrated. The pressure-proportional variable is derivable from the wheel deceleration and/or the vehicle deceleration.

A circuit configuration for carrying out the process includes circuits to which measuring variables affecting the pressure in the control chamber or chambers of the modulator are supplied and which form a modulator pressure pattern by evaluating the measuring variables, under consideration of the pressure increase and pressure decrease characteristics of the system. That is, a signal is formed which is indicative, by approximation, of the course of pressure within the control chamber or chambers of the modulator suitable for evaluation to determine the periods of excitation of the multi-way valves.

In one embodiment, circuits are provided for generating a signal approximately proportional to the pedal force and/or the pressure in the master cylinder, which signal can be evaluated informing the modulator pressure pattern and in determining the periods of excitation of the multi-way valves.

In the practice of the invention, when a program-controlled regulator is employed in a brake system including an anti-locking and/or anti-traction slip control, by making minor changes in or modifications of the program, information on the course of pressure can be obtained and this information can be used to substantially improve the control. As pressure sensors or the like are not required, this improvement involves only a minimum increase in manufacturing efforts. Since the safety spacing between the pressure in the master cylinder and in the wheel brakes prior to release of the pressure fluid conduit during the control will decrease, even a reduction in the required auxiliary energy can be expected.

BRIEF DESCRIPTION OF THE DRAWING

Further advantages, features and applications of the present invention will now be described in the following detailed description of one embodiment taken in conjunction with the accompanying drawing wherein.

DETAILED DESCRIPTION

Figure 1:
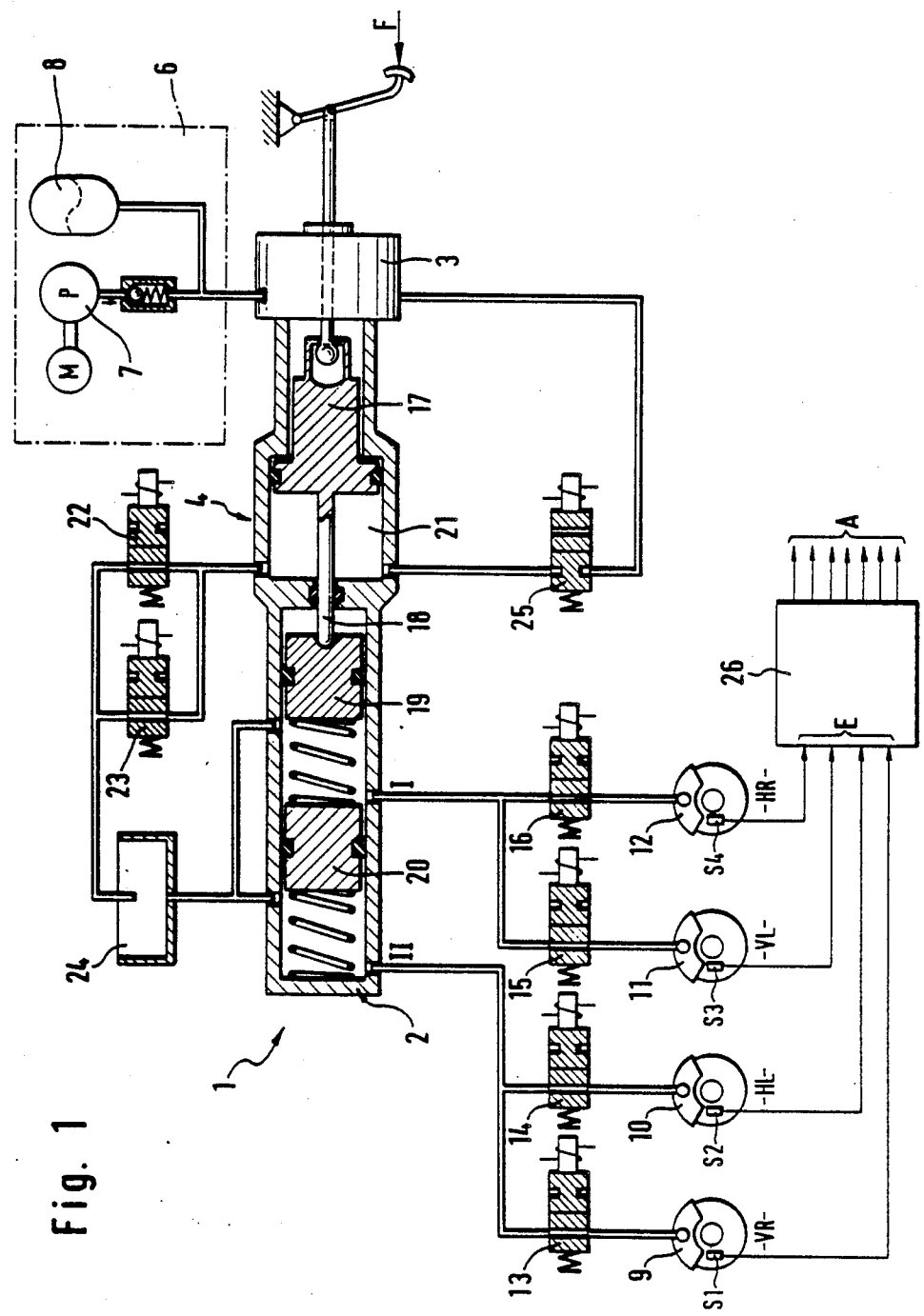
FIG. 1 is a simplified and partly schematic illustration of the major components of a brake system for carrying out the process according to the present invention.

The brake system according to FIG. 1 comprises of a brake pressure generator 1 which, in turn, consists of a tandem master cylinder 2 and a hydraulic brake force booster 3 coupled ahead thereof, and of a brake pressure modulator 4 located between the brake force booster 3 and the master cylinder 2. The auxiliary energy is supplied by an auxiliary energy source 6 including a hydraulic pump 7 actuated by electromotor force, and a pressure accumulator 8. The two brake circuits I, 11 of the tandem master cylinder 2 are connected to wheel brakes 9 through 12 of the vehicle wheels through one multi-way valve 13 through 16, respectively. These multi-way valves are 2-way/2-position valves which, in the resting position thereof, are switched to passage and, in the second switching position thereof, block the passage.

The brake pressure modulator 4, basically is made up of a modulator piston 17 which, in standard deceleration processes, transfers the auxiliary force-boosted pedal force F, through a pushrod 1B located on the front side of piston 17, to the master brake cylinder 2. The pistons of the master brake cylinder 2 hydraulically pass on the pressure, through brake circuits I, II to wheel brakes 9 through 12.

A modulator chamber 21 is provided on the front side of the modulator piston 17. The chamber 21, in the resting position and in standard or non-controlled, deceleration processes, is connected to the pressure compensating reservoir 24 of the brake system through multi-way valves 22, 23 open in their basic position. Through a valve 25, blocked in the resting position thereof, the modulator chamber may be connected to a chamber in the interior of the hydraulic brake force booster 3 in which pressure always prevails in proportion to the pedal force. For safety reasons, the pressure fluid conduit leading from the modulator chamber 21 to the reservoir 24 is guided through two identical valves 22, 23 connected in parallel because inadvertent interruption of the pressure fluid conduit would arrest the modulator piston 17 thereby rendering the brake inoperative.

Finally, FIG. 1 further shows wheel sensors S1 through S4 through which information can be obtained on the rotating pattern of the individual wheels, which information is supplied in the form of electrical signals to an electronic controller 26. Connected to the outputs A of controller 26, through signal conduits (not shown) are electromagnetically operable valves 13 through 16, 22, 23 and 25. The brake pressure control signals are generated within the controller in response to the rotating pattern of the wheels, which brake pressure control signals preclude the wheels from blocking and/or racing as a result of an excessive traction condition.

Figure 2:
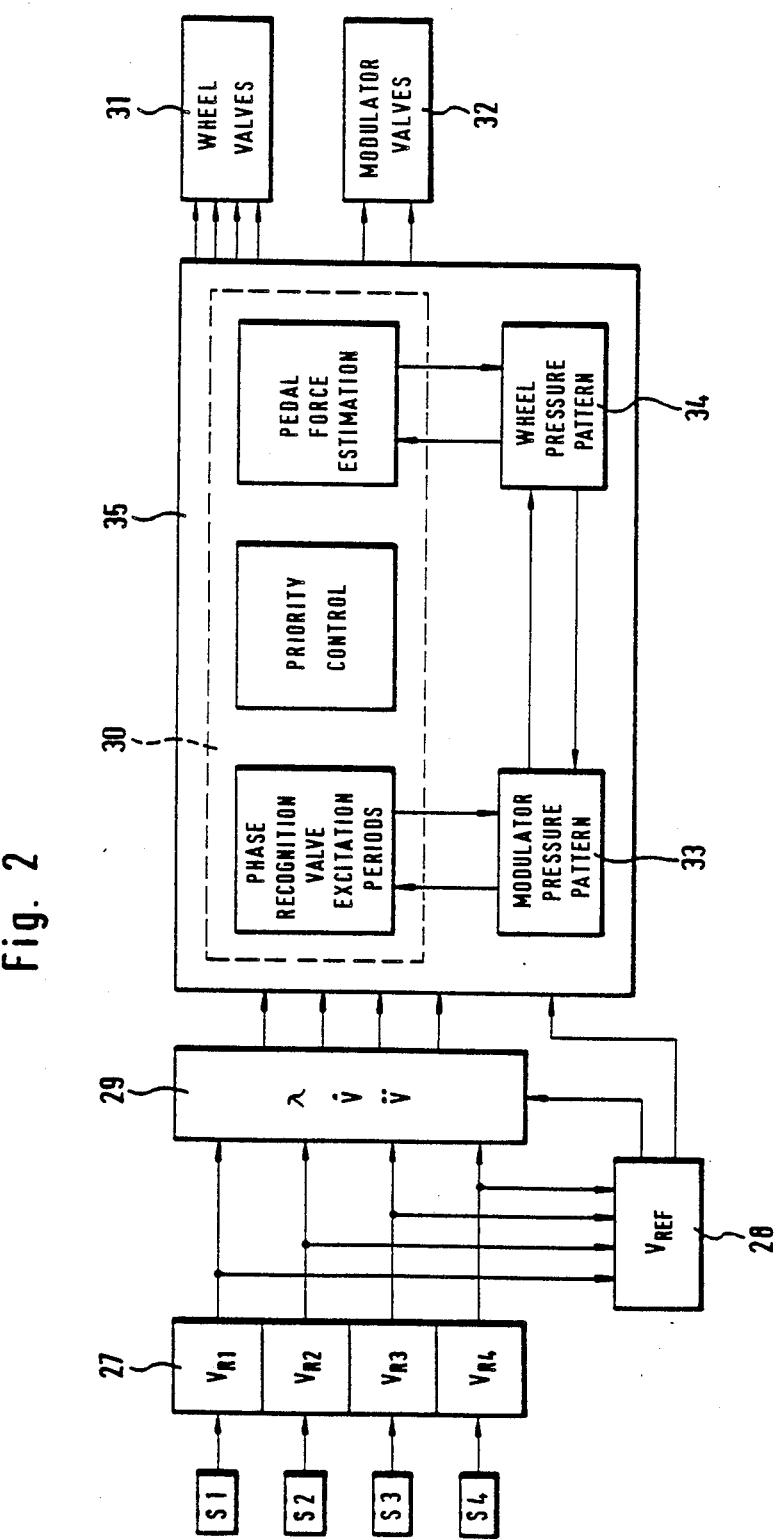
FIG. 2 is a block-type illustration of a circuit configuration for controlling the brake system according to FIG. 1; and, FIGS. 3a, 3b, and 3c show the change in speed of a wheel the modulator pressure; respectively, and the brake pressure prevailing at the same time in the wheel.

The basic construction of the electronic circuit configuration of controller 26 is shown in FIG. 2. The signals obtained by sensors S1 through S4 first are processed and boosted in a circuit 27 which contains a trigger circuit. By comparing the output signals of the circuit 27, employing predetermined criteria of selection, a so-called reference speed $V_{REF}$ is formed in a circuit 2B, serving as a reference for the brake pressure control in the individual wheel brakes and control channels, respectively. Through signal processing in a circuit 29, delay and acceleration of the individual wheels, the change in these values (the so-called "jerk"), the wheel slip, etc. are determined in a known manner from the wheel signals and are analyzed in a logic circuit 30 coupled thereto for the generation of the signals for controlling the individual valves.

Connected to the outputs of the logic circuit 30 are wheel valves 31 comprising the individual valves 13 through 16 as shown in FIG. 1, and the modulator valves 32 which are valves 22, 23, 25 as shown in FIG. 1. Moreover, in the practice of the invention, by evaluation of various sorts of information logically combined and/or generated in circuit 30, a modulator pressure pattern is formed in circuit 33, which supplies an output signal indicative, by approximation, of the course of pressure in the modulator chamber 21 (FIG. 1). The information on the instantaneous pressure in the modulator chamber 21 obtained by circuit 33 is returned, as symbolically indicated by an arrow, to the logic circuit 30 and considered in the said circuit when computing the periods of excitation of the valves.

In the simplest case, the modulator pressure pattern is formed by integration of the valve excitation periods determining the pressure in the modulator chamber 21 under consideration of the pressure increase and pressure decrease characteristics of the modulator. Of critical importance are the periods of excitation of the valves 22, 23 and 25. (FIG. 1). A closer approximation to the actual pressure condition in chamber 21 will be achieved if the instantaneous pedal force is additionally considered, approximately derivable, for example, from the delay of the vehicle or of the wheels or from the time lapsed between applying of the brake and commencement of the control.

To even more precisely determine the modulator pressure and to form an even more accurate modulator pressure pattern, respectively, the excitation times of the wheel valves 31 (13 through 16 in FIG. 1) are taken into consideration. An approximate value for the pressure in the wheel brakes (9 through 12 in FIG. 1) likewise can be determined by forming a pressure pattern, that is a so-called wheel pressure pattern, with the aid of a circuit 34. By comparing the various pressure patterns, quick identification of errors, if any, in the hydraulic system or in the circuits also is ensured. The circuits 30, 33 and 34 can be combined to form an overall circuit 35 or otherwise the function of these circuits can be transferred to one or more micro-computers or micro-controllers.

Figure 3A:
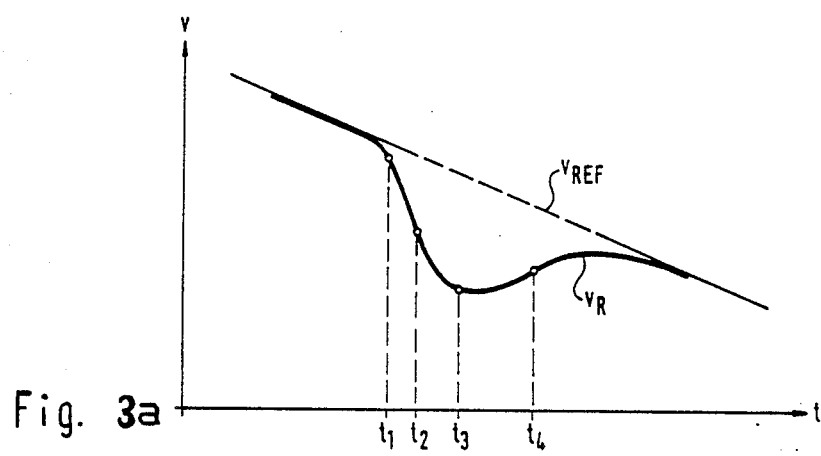
Figure 3B:
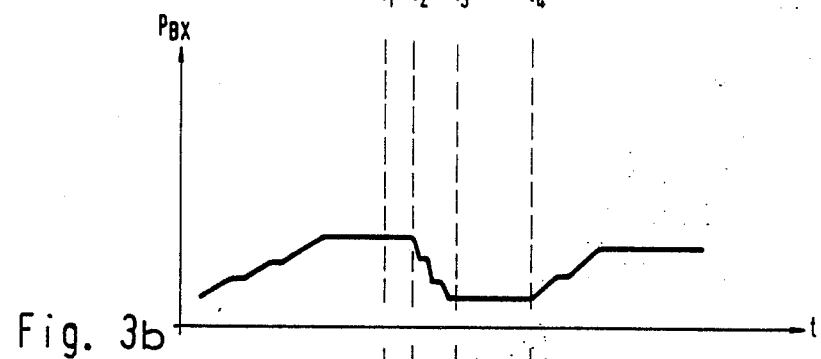
Figure 3C:
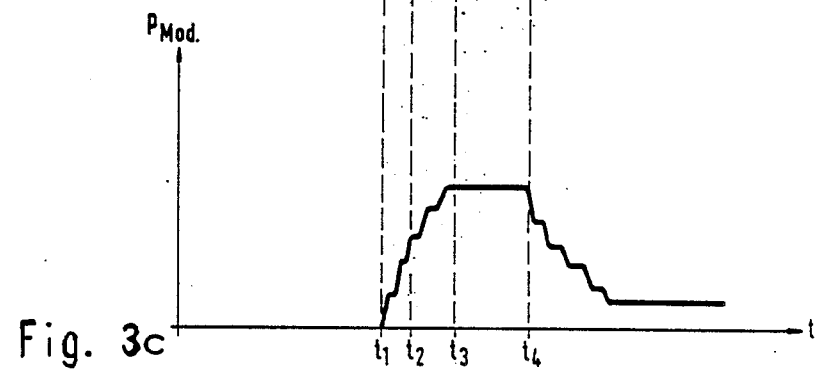

FIG. 3 shows, in a simplified example, the interconnections between the modulator pressure $P_{Mod}$ and the pressure in the wheel brake of the wheel as considered during a controlled decelerating process.

At the instant $t_1$, wheel X presently considered will become unstable. In the wheel brake of the wheel, at that time, pressure $P_{BX}$ prevails.

The modulator chamber 21 at the time $t_1$ is non-pressurized as a pressure build-up phase took place in the previously connected wheel. At the time $t_1$, the in-feed of pressure into the modulator chamber 21 commences. The wheel valve in the pressure fluid conduit of the wheel X having become unstable, however, will remain closed until $t_2$ because otherwise, as a result of the pressure (counter-pressure) still being low in the modulator chamber 21 and, consequently, high in the working chambers of the master cylinder, the wheel pressure would still further increase. Approximately at the time $t_2$, a pressure equilibrium prevails so that the wheel valve in the pressure fluid conduit leading to wheel X can be switched back into the passage position. In the wheel brake of the wheel X under consideration, a pressure decrease phase until $t_3$ will follow which, in turn, is followed by a constant pressure phase until $t_4$. Subsequently, by decreasing the pressure in the pressure chamber 21, through modulator valves 22, 23, pressure is re-fed into the re-accelerated wheel X and the brake pressure rises again.

For the sake of simplicity, FIG. 3 is restricted to a wheel X. However, in practice, in time quantization, both the pressure decrease and the pressure increase are cyclically interrupted to be continued on the next wheel, the pressure change of which instantaneously ranks first for reasons of driving stability, for example. This so-called "priority control", is an integral part of the logic circuit 30.

In the practice of the invention a model or pattern of the modulator pressure is formed in which are determined and integrated all events or quantities determining or changing the pressure in the modulator chamber. In particular, the pressure in the modulator chamber is determined by the periods of excitation of the multi way valves by way of which the pressure fluid in-flow into and out-flow of the modulator chamber is controlled. Additional variables determining the pressure are the pedal force and the wheel pressure which, in turn, is dependant on the excitation of the wheel valves. With the aid of a so-called wheel pressure pattern, the wheel pressure can be approximately determined even without the use of pressure sensors.

The pedal force, in turn, has an influence on the gradient of the pressure rise in the modulator chamber because in the embodiment of the invention shown and described, the modulator pressure is derived from the controlled brake pressure. That is, from the pedal-force-proportional pressure supplied by the brake force booster. The pressure pattern is obtained by a hardware-implemented logic circuit or, in case of brake systems having a program-controlled electronic system, by a corresponding programming. It also is possible to consider in a known manner the non-linear pressure decrease and pressure increase characteristics of the modulator and of the entire system, respectively. A measurement for the pedal force is, for example, the vehicle delay and/or the time lapsed from commencement of the brake applying to commencement of the anti-locking control. Commencement of the deceleration is signalled by the stoplight switch.

In the logic circuit 30, by comparing the wheel pressure and the modulator pressure with reference to the pressure patterns, the valve driving times are precisely determined. As in lowering the pressure in the working chambers of the master cylinder 2 or in raising the pressure to the pressure level in the wheel brake being the next one to be connected, only a very low safe distance will have to be kept, and a particularly rapid control and pressure modulation, respectively, to the desired level can be achieved. A critical disadvantage involved in the previously known brake systems with sequential control, therefore, is overcome by the present invention.

The invention has been described with reference to an anti-locking brake system. A system of this type can also be extended in a known manner to a traction slip control system and a combined anti-locking and traction slip control system. Basically, this will merely require provision of a second control chamber on the pedal side of a modulator piston into which, in case of a traction slip control, pressure fluid from the auxiliary pressure source will be fed, thereby displacing the modulator piston in the direction of pedal actuation. By measuring and evaluating the periods of excitation of the valves controlling the traction slip, in a similar manner to the process as described, also for this case of control, a modulator pressure pattern can be formed and used for improving the control logic.

What is claimed is:

1. A process for controlling a brake system with slip control wherein, in the event of control, brake pressure is sequentially modulated in the individual control channels, using a master cylinder connected to which are wheel brakes, through multi-way valves wheel open in the basic position and reswitchable to the blocking position, and a modulator coupled ahead of the master cylinder and generating, through auxiliary pressure controlled by multi-way modulator valves, a force component counter-acting the pedal force, said process comprising the steps of: determining rotating patterns of the wheels by wheel sensors with electrical signals being generated for controlling the multi-way wheel valves, forming a modulator pressure pattern representing by approximation the course of pressure in the modulator as a function of predetermined variables determining the pressure prevailing in at least one control chamber of the modulator, and determining the periods of excitation of at least one of the multi-way wheel valves and the multi-way modulator valves for the brake pressure control as a function of said signals, wherein in the step of forming the modulator pressure pattern, the periods of excitation of said multi-way modulator valves, in the actuation of the modulator, are measured and integrated under incorporation of the pressure increase and pressure decrease characteristics of the system.

2. A process for controlling a brake system with slip control wherein, in the event of control, brake pressure is sequentially modulated in the individual control channels, using a master cylinder connected to which are wheel brakes, through multi-way valves wheel open in the basic position and reswitchable to the blocking position, and a modulator coupled ahead of the master cylinder and generating, through auxiliary pressure controlled by multi-way modulator valves, a force component counter-acting the pedal force, said process comprising the steps of: determining rotating pattern of the wheels by wheel sensors with electrical signals being generated for controlling the multi-way wheel valves, forming a modulator pressure pattern representing by approximation the course of pressure in the modulator as a function of predetermined variables determining the pressure prevailing in at least one control chamber of the modulator, and determining the periods of excitation of the multi-way valves for the brake pressure control as a function of said signals, wherein the value approximately proportional to the pedal force (F) is derived at least one of the vehicle deceleration and the time lapsed between applying of the brakes and commencement of the slip control.

3. A process for controlling a brake system with slip control wherein, in the event of control, brake pressure is sequentially modulated in the individual control channels, using a master cylinder connected to which are wheel brakes, through multi-way valves wheel open in the basic position and reswitchable to the blocking position, and a modulator coupled ahead of the master cylinder and generating, through auxiliary pressure controlled by multi-way modulator valves, a force component counter-acting the pedal force, said process comprising the steps of: determining rotating pattern of the wheels by wheel sensors with electrical signals being generated for controlling the multi-way wheel valves, forming a modulator pressure pattern representing by approximation the course of pressure in the modulator as a function of predetermined variables determining the pressure prevailing in at least one control chamber of the modulator, and determining the periods of excitation of at least one of the multi-way wheel valves and the multi-way modulator valves for the brake pressure control as a function of said signals, wherein the periods of excitation of the multi-way wheel valves provided in the pressure fluid conduits leading to the wheel brakes are taken into consideration in forming the modulator pressure pattern.

4. A process for controlling a brake system with slip control wherein, in the event of control, brake pressure is sequentially modulated in the individual control channels, using a master cylinder connected to which are wheel brakes, through multi-way valves wheel open in the basic position and reswitchable to the blocking position, and a modulator coupled ahead of the master cylinder and generating, through auxiliary pressure controlled by multi-way modulator valves, a force component counter-acting the pedal force, said process comprising the steps of: determining rotating pattern of the wheels by wheel sensors with electrical signals being generated for controlling the multi-way wheel valves, forming a modulator pressure pattern representing by approximation the course of pressure in the modulator as a function of predetermined variables determining the pressure prevailing in at least one control chamber of the modulator, and determining the periods of excitation of at least one of the multi-way wheel valves and the multi-way modulator valves for the brake pressure control as a function of said signals, whereby by measuring and integrating variables determining the pressure prevailing in the wheel brakes, a wheel pressure pattern is formed and is considered when determining the periods of excitation of the said at least one of the multi-way wheel valves and the multi-way modulator valves.

5. A process for controlling a brake system with slip control wherein, in the event of control, brake pressure is sequentially modulated in the individual control channels, using a master cylinder connected to which are wheel brakes, through multi-way valves wheel open in the basic position and reswitchable to the blocking position, and a modulator coupled ahead of the master cylinder and generating, through auxiliary pressure controlled by multi-way modulator valves, a force component counter-acting the pedal force, said process comprising the steps of: determining rotating pattern of the wheels by wheel sensors with electrical signals being generated for controlling the multi-way wheel valves, forming a modulator pressure pattern representing by approximation the course of pressure in the modulator as a function of predetermined variables determining the pressure prevailing in at least one control chamber of the modulator, and determining the periods of excitation of at least one of the multi-way wheel valves and the multi-way modulator valves for the brake pressure control as a function of said signals, wherein in the step of forming the wheel pressure pattern, the periods of excitation of the multi-way wheel valves provided in the pressure fluid conduits leading to the wheel brakes, are measured and integrated under incorporation of the pressure increase and pressure decrease characteristics of the system and a variable proportional to the pressure in the wheel brake upon commencement of the slip control.

6. The process according to claim 5 wherein the variable proportional to the pressure is derived from the wheel deceleration and the vehicle deceleration.

* * * * *